United States Patent [19]
Chiou et al.

[11] Patent Number: 4,718,749
[45] Date of Patent: Jan. 12, 1988

[54] PHASE-CONJUGATE INTERFEROMETRIC COHERENT IMAGE SUBTRACTION

[75] Inventors: Arthur E. Chiou, Newbury Park; Pochi A. Yeh, Thousand Oaks, both of Calif.

[73] Assignee: Rockwell International Corporation, El Segundo, Calif.

[21] Appl. No.: 944,053

[22] Filed: Dec. 17, 1986

[51] Int. Cl.[4] .............................................. G02B 27/10
[52] U.S. Cl. ..................................... 350/163; 350/370; 364/800
[58] Field of Search ................. 350/163, 370; 364/800

[56] References Cited

U.S. PATENT DOCUMENTS

| | | | |
|---|---|---|---|
| 4,025,195 | 5/1977 | Ebersole et al. | 356/71 |
| 4,124,278 | 11/1978 | Grinberg et al. | 350/342 |
| 4,212,536 | 7/1980 | Bencze et al. | 350/3.83 |
| 4,320,966 | 3/1982 | Reytblatt | 350/162 SF X |
| 4,372,649 | 2/1983 | Kellie | 350/162 SF |

OTHER PUBLICATIONS

Indebetouw, et al., Real-Time Incoherent Subtraction of Irradiance, Applied Optics, vol. 19, pp. 1218–1219, (1980).
Ja, Real-Time Image Subtraction in Four-Wave Mixing with Photorefractive $Bi_{12}GeO_{20}$ Crystals, Optics Communications, vol. 42, pp. 377–380 (1982).
Patorski, Subtraction and Addition of Optical Signals Using a Double-Grating Shearing Interferometer, Optics Communications, vol. 29, pp. 13–16 (1979).
Yu, et al., Incoherent Image Addition and Subtraction: A Technique, Applied Optics, vol. 18, pp. 2705–2707 (1979).

Primary Examiner—Bruce Y. Arnold
Attorney, Agent, or Firm—H. Fredrick Hamann; Craig O. Malin; John J. Deinken

[57] ABSTRACT

A phase conjugate interferometer includes a source of coherent light and a first beam splitter for dividing the coherent light into a transmitted portion and a reflected portion. A second beam splitter is positioned to divide the transmitted portion into an outgoing transmitted beam and an outgoing reflected beam, with the outgoing transmitted beam oriented to pass through the first image and the outgoing reflected beam oriented to pass through the second image. A phase-conjugate reflector is positioned to reflect the outgoing transmitted beam as a first incoming beam and the outgoing reflected beam as a second incoming beam. The incoming beams are directed toward the second beam splitter, which divides the incoming beams into a first combined beam and a second combined beam. The second combined beam is directed toward the first beam splitter, which divides the second combined beam into a third combined beam and a transmitted beam. With this arrangement, the first combined beam contains the difference between the intensities of the first and second images and the third combined beam contains the sum of the intensities of the first and second images.

7 Claims, 2 Drawing Figures

PHASE-CONJUGATE INTERFEROMETRIC COHERENT IMAGE SUBTRACTION

GOVERNMENT RIGHTS

The U.S. Government has rights in this invention pursuant to a contract awarded by the Department of the Navy.

BACKGROUND OF THE INVENTION

This invention is converned with techniques for determining the difference between two optical images.

Real-time image processing is becoming an area of great interest to robotics and artificial intelligence. A clear advantage to the optical approach for these applications is the capability of parallel processing. Additional areas of application include industrial quality assurance, optical logic gates, and the detection of motion in a scene.

In principle, coherent image subtraction and addition can be achieved with an interferometer, such as the Mach-Zender or Michelson configurations. Image subtraction is accomplished with an interferometer by destructive interference, which requires that the phases of the illuminating beams be 180° out of phase throughout the two dimensional region within which the images overlap. In practice, however, the overlapped image intensity tends to drift between the extrema because of phase fluctuations due to ambient air currents and thermal drift. Perfect alignment of the interferometer is another problem because such interferometers are extremely sensitive to misalignment.

Therefore, a need has developed in the art for an interferometric image subtraction scheme which is self-aligned and is independent of the optical path length of the interferometer arms.

SUMMARY OF THE INVENTION

A phase conjugate interferometer for combining first and second two dimensional images includes a source of coherent light and a beam splitter for dividing the coherent light into an outgoing transmitted beam and an outgoing reflected beam, with the outgoing transmitted beam oriented to pass through the first image and the outgoing reflected beam oriented to pass through the second image. A first phase-conjugating reflector is positioned to reflect the outgoing transmitted beam toward the beam splitter as a first incoming reflected beam, while a second phase-conjugating reflector is positioned to lock in phase with the first reflector and reflect the outgoing reflected beam toward the beam splitter as a second incoming reflected beam. The incoming beams are merged at and split by the beam splitter, resulting in a first combined beam containing the difference between the intensities of the first and second images and a second combined beam containing the sum of the intensities of the first and second images.

Self-pumping phase-conjugating crystals may be used as the first and second phase-conjugate reflectors.

Another embodiment includes a source of coherent light and a first beam splitter for dividing the coherent light into a transmitted portion and a reflected portion. A second beam splitter is positioned to divide the transmitted portion into an outgoing transmitted beam and an outgoing reflected beam, with the outgoing transmitted beam oriented to pass through the first image and the outgoing reflected beam oriented to pass through the second image. A phase-conjugate reflector is positioned to reflect the outgoing transmitted beam as a first incoming beam and the outgoing reflected beam as a second incoming beam. The incoming beams are directed toward the second beam splitter, which divides the incoming beams into a first incoming reflected beam and a first incoming transmitted beam. The first incoming transmitted beam is directed toward the first beam splitter, which divides the first incoming transmitted beam into a second incoming reflected beam and a second incoming transmitted beam. With this arrangement, the first incoming reflected beam contains the difference between the intensities of the first and second images and the second incoming reflected beam contains the sum of the intensities of the first and second images.

A method for coherently combining first and second two dimensional images includes the steps of providing a source of coherent light and a beam splitter. The coherent light is divided by the beam splitter into an outgoing transmitted beam and an outgoing reflected beam, with the outgoing transmitted beam oriented to pass through the first image and the outgoing reflected beam oriented to pass through the second image. A first phase-conjugate reflector is used to reflect the outgoing transmitted beam toward the beam splitter as a first incoming reflected beam. The phase of the first phase-conjugate reflector is locked in with the phase of a second phase-conjugate reflector and the outgoing reflected beam is reflected, with the second phase-conjugate reflector, toward the beam splitter as a second incoming reflected beam. The incoming beams are then divided by the beam splitter, resulting in a first combined beam containing the difference between the intensities of the first and second images and a seocnd combined beam containing the sum of the intensities of the first and second images.

DESCRIPTION OF THE INVENTION

This invention provides dynamically stable parallel image subtraction and addition using phase conjugate interferometry. The interferometer of this invention is particularly advantageous since its operation is not affected by misalignment or optical path length perturbations. By equipping a Michelson type of interferometer with phase-conjugate mirrors, this invention employs the time reversing character of phase-conjugated beams to ensure that relative phase delays, due to any optical path differences, and slow phase fluctuations, from air currents along the paths and/or thermal drifts, are exactly cancelled after the round trip passage of the beams from the beam splitter to the phase conjugator.

Figure 1:
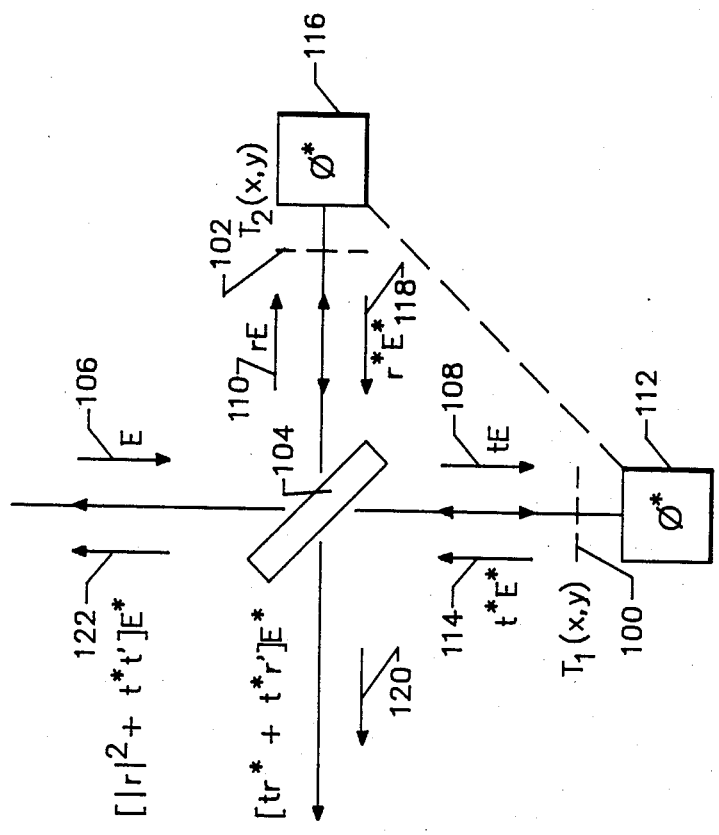
FIG. 1 is a schematic diagram depicting the beam paths and amplitudes for a phase-conjugate interferometer.

FIG. 1 is a schematic diagram depicting the beam paths and amplitudes for a phase-conjugate interferometer constructed according to the present invention. The interferometer is adapted to combine a first image 100 and a second image 102. The interferometer includes a beam splitter 104, which divides a source of coherent light 106 into an outgoing transmitted beam 108 and an outgoing reflected beam 110, with the outgoing transmitted beam oriented to pass through the first transparent image 100 and the outgoing reflected beam 110 oriented to pass through the second transparent image 102. A first phase-conjugate reflector 112 is positioned to reflect the outgoing transmitted beam back toward the beam splitter 104 as a first incoming reflected beam 114, while a second phase-conjugate reflector 116 reflects the outgoing reflected beam 110 toward the beam splitter as a second incoming reflected beam 118. The incoming reflected beams 114 and 118 merge at and are split by the beam splitter 104, resulting in a first combined beam 120, directed toward port A, and a second combined beam 122, directed toward port B. With this arrangement, the first combined beam 120 contains the difference between the intensities of the first and second images, while the second combined beam 122 contains the sum of the intensities of the first and second images. To operate properly, these differencing and summing functions require that the two phase-conjugate reflectors 112 and 116 be locked together in phase. This lock-in will occur if the two reflectors are located reasonably close to one another with an optical path between them.

The operation of this interferometer can be further explained by performing a simple analysis to develop the Stokes equations for time reversal. In FIG. 1, let t, r, and t', r' be the amplitude transmission and reflection coefficients of the beam splitter 104 for beams incident from the right and left sides of the beam splitter, respectively. The incoming beam 106 with complex field amplitude E is divided by the beam splitter into the outgoing reflected beam 110 with amplitude rE and the outgoing transmitted beam 108 with amplitude tE. The reflected beam 110 is reflected by the phase conjugator 116, resulting in the incoming reflected beam 118 with amplitude r*E*, while the transmitted beam 108 is reflected by the phase conjugator 112, producing the incoming reflected beam 114 with amplitude t*E*.

The reflected beams 114 and 118 are further split by the beam splitter 104 and their components are recombined, resulting in the beam 120, with amplitude tr*E*+r't*E*, arriving at port A and the beam 122, with amplitude t't*E*+rr*E*, which is directed toward port B. The time reversal equivalent of phase conjugation implies that the final outcome of this splitting and recombining process should yield nothing but a beam with amplitude E*, travelling toward port B with a direction opposite to that of the incoming beam 106. Mathematically, this equivalence condition requires that:

$$[|r|^2 + t^*t']E^* = E^* \quad (1)$$

$$[tr^* + t^*r']E^* = 0 \quad (2)$$

i.e., $$|r|^2 + t^*t' = 1 \quad (3)$$

$$tr^* + t^*r' = 0 \quad (4)$$

Since $t = t'$ for any passive linear medium, Equation (3) can be rewritten as:

$$R + T = 1 \quad (5)$$

where R and T are the (intensity) reflectance and transmittance of the beam splitter. Note that Equation (5) is simply a statement of conservation of energy, while Equation (4) establishes the conditions on the amplitudes and phases which result in complete cancellation of the field at port A. These relationships are known as the Stokes equations after G. G. Stokes (see Camb. Dubl. Math. J., Volume 4, Page 1 (1849)).

When the interferometer is operated as an image subtracter, each of the two beams 108 and 110 passes through a transparent image and is then reflected by a self-pumped phase conjugator. By applying an analysis similar to the one given above, it is straightforward to show that when these two phase-conjugated beams recombine at the beam splitter, the image intensity at the output port A is given by:

$$I_A(x,y) = |E|^2 |\rho|^2 |t^*r'T_1(x,y) + r^*tT_2(x,y)|^2 \quad (6)$$

where $\rho$ is the reflection coefficient of the phase conjugator and $T_1(x,y)$ and $T_2(x,y)$ are the intensity transmittance functions of the transparent images 100 and 102. Using Equation (4), the intensity at output port A becomes:

$$I_A(x,y) = |E|^2 |\rho|^2 RT |T_1(x,y) - T_2(x,y)|^2 \quad (7)$$

Equation (7) indicates that the output intensity at port A will be proportional to the square of the difference between the intensity transmittance functions.

At the other image plane (output port B in FIG. 1), the intensity distribution will be given by:

$$I_B(x,y) = |E|^2 |\rho|^2 |TT_1(x,y) + RT_2(x,y)|^2 \quad (8)$$

which is proportional to the square of the sum of the two intensity transmittance functions.

Figure 2:
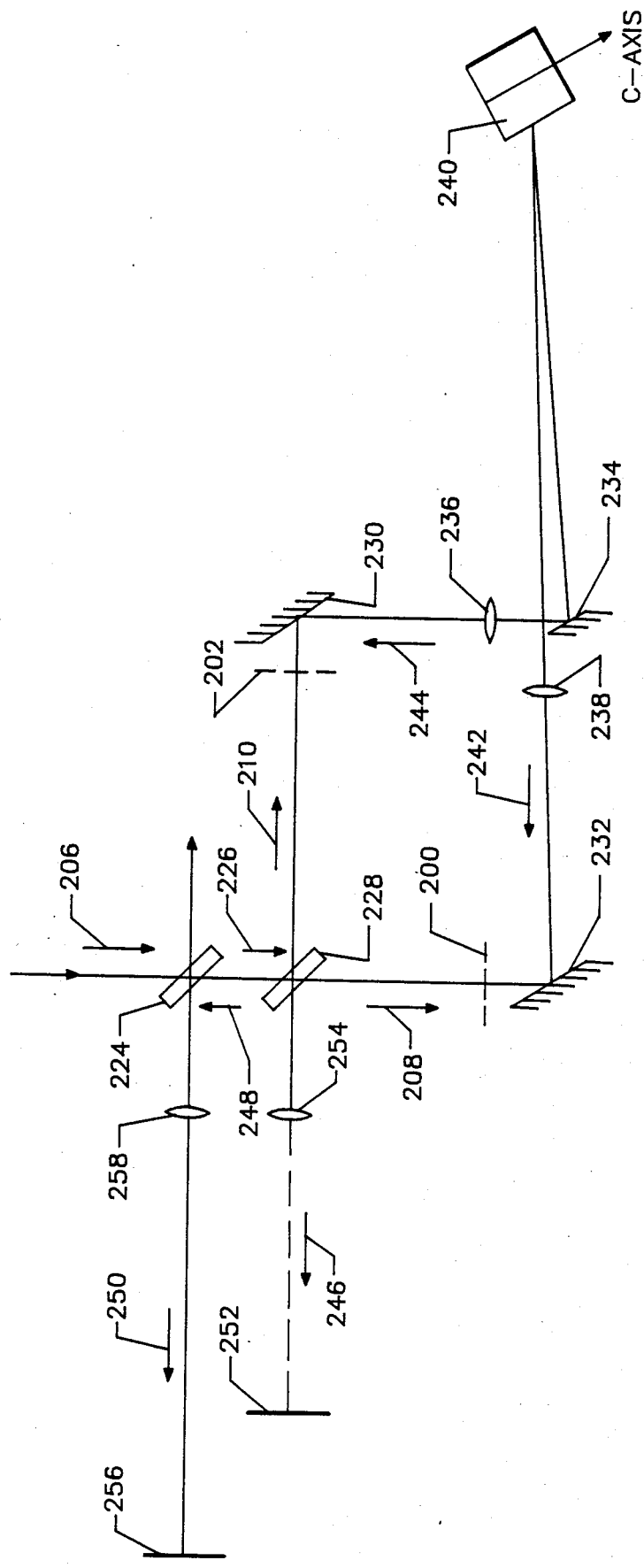
FIG. 2 is a schematic diagram illustrating an alternative phase conjugate interferometer design which eliminates the need for phase lock-in between two phase-conjugate reflectors.

FIG. 2 is a schematic diagram illustrating a phase conjugate interferometer which incorporates one preferred embodiment of this invention and eliminates the need for phase lock-in between two phase-conjugate reflectors. The coherent light 206 is provided by an argon ion laser operating at 5145 Angstroms with an output power of a few hundred milliwatts. The laser output, after spatial filtering through a 5X microscope objective and a 25 micron diameter aperture, is expanded and collimated to a 1 cm diameter beam size. A first beam splitter 224, with an intensity transmittance of 77%, divides the coherent light into a transmitted portion 226 and a reflected portion. The transmitted portion 226 impinges on a second beam splitter 228, which has an intensity transmittance of 64% and splits the light into an outgoing transmitted beam 208 and an outgoing reflected beam 210, with the outgoing transmitted beam oriented to pass through a first image 200 and the outgoing reflected beam oriented to pass through a second image 202, each of the images being positioned perpendicular to its respective beam. Mirrors 230, 232, and 234, and lens 236 and 238, direct the beams 208 and 210 onto the "a" face of a self pumping barium titanate phase-conjugating crystal 240, with angles of incidence of approximately 15° and 19°. These beams are polarized in the xz plane (i.e., the plane of incidence) and excite only extraordinary waves in the crystal. Both beams self-pump the crystal and are phase-conjugated with a reflectance of about 32%. The beam 208 is returned as a first incoming beam 242 and the beam 210 is returned as a second incoming beam 244. The incoming beam 242 is directed by the mirror 232 toward the beam splitter 228, while the incoming beam 244 is directed toward the beam splitter 228 by the mirror 230. The beam splitter divides the combined incoming beams into a first combined beam 246 and a second combined beam 248. The beam 246 is focussed on a first imaging plane 252 by a lens 254 with a focal length of 250 mm, while the beam splitter 224 divides the beam 248 into a third combined beam 250 and a transmitted beam. The combined beam 250 is focussed on a second imaging plane 256 by a lens 258, also having a focal length of 250 mm. The first combined beam 246 contains the difference between the intensities of the first and second images, while the third combined beam 250 contains the sum of the intensities of the first and second images.

Experiments with the apparatus depicted in FIG. 2 have demonstrated that the two images are subtracted from each other at the image plane 252 and are added together at the image plane 256. These operations are independent of the optical path lengths of the two arms of the interferometer. According to Equation (8), the addition of the two images is performed with weighting factors T and R, respectively. The subtraction, however, is independent of the ratio of R and T. In practice, the subtracted and the added image intensities may differ slightly from the theoretical values given above because the phase-conjugate reflectivity does depend on the intensity, orientation, and position of the incident beam.

The phase conjugate image subtracter can also perform logic operations. Consider the case where both transparencies are binary, i.e., either 1, completely transmitting, or 0, opaque. According to Equation (7), a complete cancellation would require that these two transparencies be identical. An output intensity of 1 will appear at the first port when only one of the two transparencies transmits. Thus such an image subtracter can act as an XOR gate. In the case where the transparencies are encoded with a matrix of binary data, such an image subtracter acts as a two-dimensional array of XOR gates.

The preferred embodiments of this invention have been illustrated and described above. Modifications and additional embodiments, however, will undoubtedly be apparent to those skilled in the art. This technique is also useful, for example, to achieve intensity inversion of an image, which is a special case of image subtraction obtained by removing one of the transparencies so that the transmittance $T_i(x,y)$ becomes unity in one arm. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

What is claimed is:

1. A phase conjugate interferometer for combining first and second two dimensional images, comprising:
   a source of coherent light;
   a beam splitter for dividing the coherent light into an outgoing transmitted beam and an outgoing reflected beam, with the outgoing transmitted beam oriented to traverse the first image and the outgoing reflected beam oriented to traverse the second image;
   a first phase-conjugate reflector positioned to reflect the outgoing transmitted beam toward the beam splitter as a first incoming reflected beam;
   a second phase-conjugate reflector positioned to lock in phase with the first reflector and reflect the outgoing reflected beam toward the beam splitter as a second incoming reflected beam;
   the incoming beams being merged at and split by the beam splitter, resulting in a first combined beam containing the difference between the intensities of the first and second images and a second combined beam containing the sum of the intensities of the first and second images.

2. The interferometer of claim 1, wherein the first and second phase-conjugate reflectors further comprise self-pumping phase-conjugating crystals.

3. A phase conjugate interferometer for combining first and second two dimensional images, comprising:
   a source of coherent light;
   a first beam splitter for dividing the coherent light into a transmitted portion and a reflected portion;
   a second beam splitter positioned to divide the transmitted portion into an outgoing transmitted beam and an outgoing reflected beam, with the outgoing transmitted beam oriented to pass through the first image and the outgoing reflected beam oriented to pass through the second image; and
   a phase-conjugate reflector positioned to reflect the outgoing transmitted beam as a first incoming beam and the outgoing reflected beam as a second incoming beam, the incoming beams being directed toward the second beam splitter, which divides the incoming beams into a first combined beam and a second combined beam, the second combined beam being directed toward the first beam splitter, which divides the second combined beam into a third combined beam and a transmitted beam;
   whereby the first combined beam contains the difference between the intensities of the first and second images and the third combined beam contains the sum of the intensities of the first and second images.

4. The interferometer of claim 3, wherein the outgoing transmitted beam is further oriented to pass through the first image with the axis of the outgoing transmitted beam perpendicular to the plane of the first image and the outgoing reflected beam is further oriented to pass through the second image with the axis of the outgoing reflected beam perpendicular to the plane of the second image.

5. The interferometer of claim 3, further comprising a first lens for focussing the outgoing transmitted beam on the phase-conjugate reflector and a second lens for focussing the outgoing reflected beam on the phase-conjugate reflector.

6. The interferometer of claim 3, further comprising a first lens for focussing the first combined beam on a first imaging plane and a second lens for focussing the third combined beam on a second imaging plane.

7. A method for coherently combining first and second two dimensional images, comprising:
   providing a source of coherent light;
   providing a beam splitter;
   dividing the coherent light with the beam splitter into an outgoing transmitted beam and an outgoing reflected beam, with the outgoing transmitted beam oriented to traverse the first image and the outgoing reflected beam oriented to traverse the second image;
   reflecting, with a first phase-conjugate reflector, the outgoing transmitted beam toward the beam splitter as a first incoming reflected beam;

locking the phase of the first phase-conjugate reflector with the phase of a second phase-conjugate reflector;

reflecting, with the second phase-conjugate reflector, the outgoing reflected beam toward the beam splitter as a second incoming reflected beam;

dividing the incoming beams with the beam splitter, resulting in a first combined beam containing the difference between the intensities of the first and second images and a second combined beam containing the sum of the intensities of the first and second images.

* * * * *